US012749739B2

(12) United States Patent
Naka et al.

(10) Patent No.: US 12,749,739 B2
(45) Date of Patent: Sep. 29, 2026

(54) NEGATIVE ELECTRODE FOR AQUEOUS ELECTROLYTE CELL AND SHEET-TYPE CELL

(71) Applicant: Maxell, Ltd., Otokuni-gun (JP)

(72) Inventors: Yasuhiro Naka, Otokuni-gun (JP); Takahiro Furutani, Otokuni-gun (JP)

(73) Assignee: MAXELL, LTD., Otokuni-gun (JP)

( * ) Notice: Subject to any disclaimer, the term of this patent is extended or adjusted under 35 U.S.C. 154(b) by 71 days.

(21) Appl. No.: 17/427,977

(22) PCT Filed: Feb. 7, 2020

(86) PCT No.: PCT/JP2020/004763
§ 371 (c)(1),
(2) Date: Aug. 3, 2021

(87) PCT Pub. No.: WO2020/162591
PCT Pub. Date: Aug. 13, 2020

(65) Prior Publication Data

US 2022/0093996 A1 Mar. 24, 2022

(30) Foreign Application Priority Data

Feb. 8, 2019 (JP) ................................ 2019-021570

(51) Int. Cl.
*H01M 12/06* (2006.01)
*H01M 4/42* (2006.01)
(Continued)

(52) U.S. Cl.
CPC ........... *H01M 12/065* (2013.01); *H01M 4/42* (2013.01); *H01M 4/663* (2013.01); *H01M 4/80* (2013.01);
(Continued)

(58) Field of Classification Search
CPC ...... H01M 12/02; H01M 12/065; H01M 4/42; H01M 4/663; H01M 4/80; H01M 50/121; H01M 2300/0005
See application file for complete search history.

(56) References Cited

U.S. PATENT DOCUMENTS 4,432,937 A 2/1984 Kuwayama et al.
4,968,569 A 11/1990 Chiba et al.
(Continued)

FOREIGN PATENT DOCUMENTS

EP 0 819 774 A1 1/1998
EP 3 518 339 A1 7/2019
(Continued)

OTHER PUBLICATIONS

JP-2016046116-A English machine translation (Year: 2023).*
(Continued)

*Primary Examiner* — Armindo Carvalho, Jr.
(74) *Attorney, Agent, or Firm* — WHDA, LLP

(57) ABSTRACT

A negative electrode for an aqueous electrolyte cell disclosed in the present application contains an electrolytic zinc foil as an active material layer. The electrolytic zinc foil is preferably composed of zinc alloy containing Bi in a proportion of 0.001 to 0.2% by mass. A sheet-type cell disclosed in the present application includes a sheet-type outer case and a power generation element contained in the sheet-type outer case. The power generation element includes a positive electrode, a negative electrode, a separator, and an aqueous electrolyte solution. The negative electrode is the negative electrode for an aqueous electrolyte cell of the present application.

17 Claims, 2 Drawing Sheets

(51) Int. Cl.
*H01M 4/66* (2006.01)
*H01M 4/80* (2006.01)
*H01M 12/02* (2006.01)
*H01M 50/121* (2021.01)

(52) U.S. Cl.
CPC .......... *H01M 12/02* (2013.01); *H01M 50/121* (2021.01); *H01M 2300/0005* (2013.01)

(56) References Cited

U.S. PATENT DOCUMENTS

| | | | | |
|---|---|---|---|---|
| 2007/0111096 | A1* | 5/2007 | Kobayashi | H01M 4/12 429/229 |
| 2015/0093630 | A1 | 4/2015 | Han et al. | |
| 2016/0111755 | A1* | 4/2016 | Liu | H01M 4/625 429/188 |
| 2016/0133882 | A1* | 5/2016 | Lee | H01M 10/0525 429/163 |
| 2017/0025646 | A1* | 1/2017 | Ota | H01M 10/0413 |
| 2017/0062869 | A1* | 3/2017 | Zhamu | H01M 4/133 |
| 2018/0131012 | A1* | 5/2018 | Mackenzie | H01M 10/0565 |
| 2019/0348730 | A1 | 11/2019 | Furutani et al. | |
| 2019/0350665 | A1 | 11/2019 | Furutani et al. | |
| 2019/0363412 | A1 | 11/2019 | Furutani et al. | |
| 2020/0303727 | A1* | 9/2020 | Armacanqui | H01M 4/06 |
| 2020/0373527 | A1 | 11/2020 | Furutani et al. | |
| 2021/0091385 | A1 | 3/2021 | Furutani et al. | |
| 2021/0399282 | A1* | 12/2021 | Huang | H01M 4/661 |

FOREIGN PATENT DOCUMENTS

| | | | | |
|---|---|---|---|---|
| EP | 3567648 | A1 | 11/2019 | |
| EP | 3689227 | A1 | 8/2020 | |
| EP | 3 767 738 | A1 | 1/2021 | |
| FO | 3531501 | A1 | 8/2019 | |
| JP | 56-79856 | A | 6/1981 | |
| JP | 56-123462 | U | 9/1981 | |
| JP | 58-26456 | A | 2/1983 | |
| JP | 58-42740 | A | 3/1983 | |
| JP | 61-224266 | A | 10/1986 | |
| JP | 10-40904 | A | 2/1998 | |
| JP | H11-86869 | | 3/1999 | |
| JP | 2016046116 | A * | 4/2016 | |
| JP | 6454824 | B1 | 1/2019 | |
| WO | WO-2005055345 | A1 * | 6/2005 | C25D 1/04 |
| WO | 2018/056307 | A1 | 3/2018 | |
| WO | 2018/128191 | A1 | 7/2018 | |
| WO | 2019/064637 | A1 | 4/2019 | |
| WO | 2019/065029 | A1 | 4/2019 | |
| WO | 2019/177025 | A1 | 9/2019 | |
| WO | 2020/071350 | A1 | 4/2020 | |

OTHER PUBLICATIONS

WO-2005055345-A1 English machine translation (Year: 2025).*

Office Action dated Oct. 19, 2021, issued in counterpart JP Application No. 2020-571286, with machine translation. (6 pages).

Supplementary European search report dated Mar. 7, 2022, issued in counterpart EP Application No. 20752202.0. (5 pages).

Office Action dated Mar. 18, 2022, issued in counterpart EP Application No. 20752202.0. (6 pages).

International Search Report dated Apr. 14, 2020, issued in counterpart International Application No. PCT/JP2020/004763 (3 pages).

Office Action dated Apr. 3, 2024, issued in counterpart CN Application No. 202080012293.9, with English translation. (14 pages).

* cited by examiner

FIG. 1
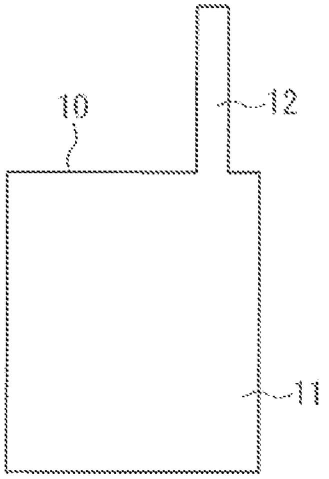
FIG. 2
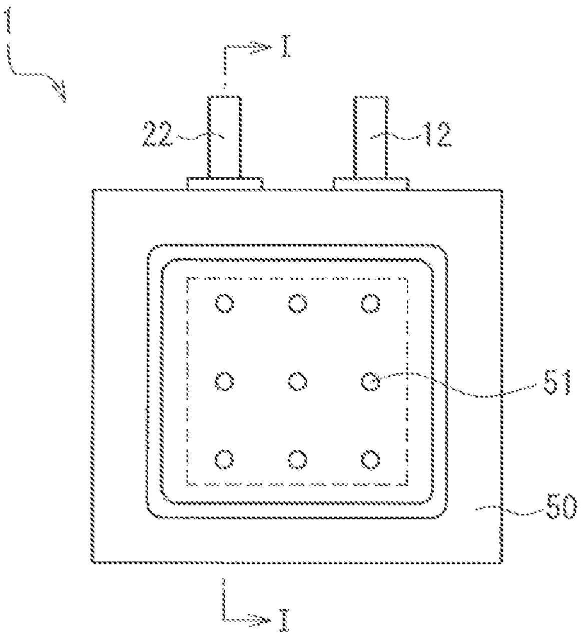
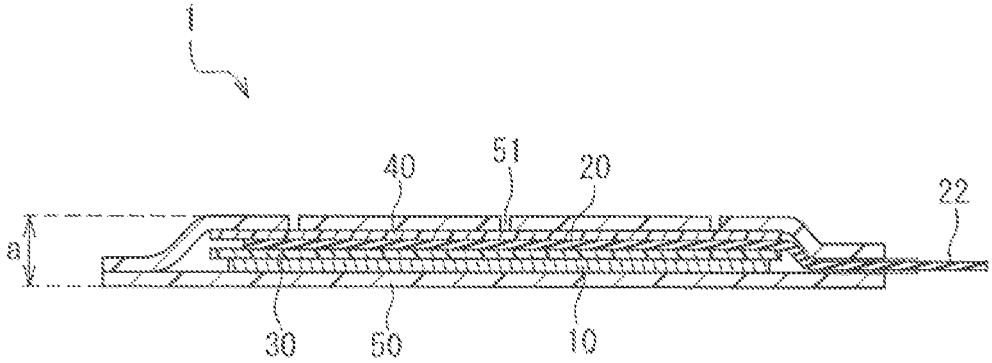
FIG. 3

NEGATIVE ELECTRODE FOR AQUEOUS ELECTROLYTE CELL AND SHEET-TYPE CELL

TECHNICAL FIELD

The present application relates to a negative electrode suitable for an aqueous electrolyte cell such as an air cell, and a sheet-type cell having the negative electrode.

BACKGROUND ART

Cells having a negative electrode made of zinc or zinc alloy, such as air cells and alkaline cells, are generally classified by shape into a button cell using a metal outer can and a cylindrical cell using a cylindrical outer can.

On the other hand, the cells having the above negative electrode are also classified as a sheet-type cell using an outer case of a resin film (e.g., Patent Document 1). In the sheet-type cell of Patent Document 1, the negative electrode contains zinc or zinc alloy in the form of foil as well as particles.

PRIOR ART DOCUMENTS

Patent Documents

Patent Document 1: WO 2018/056307

DISCLOSURE OF INVENTION

Problem to be Solved by the Invention

When a cell includes zinc or zinc alloy as a negative electrode active material as described above, the corrosion of zinc is likely to cause the generation of gas in the cell. This may result in poor storage characteristics of the cell. The use of zinc in the form of foil makes it easier to reduce the generation of gas, as compared to the use of zinc in the form of particles, but still has room for improvement in long-term storage characteristics.

The present application has been made in view of the above circumstances and provides a sheet-type cell with excellent storage characteristics and a negative electrode that can constitute the sheet-type cell.

Means for Solving Problem

A negative electrode for an aqueous electrolyte cell disclosed in the present application contains an electrolytic zinc foil as an active material layer. In the context of this specification, the electrolytic zinc foil includes an electrolytic foil composed of zinc (and inevitable impurities) and an electrolytic foil composed of zinc alloy.

A sheet-type cell disclosed in the present application includes a sheet-type outer case and a power generation element contained in the sheet-type outer case. The power generation element includes a positive electrode, a negative electrode, a separator, and an aqueous electrolyte solution. The negative electrode is the negative electrode for an aqueous electrolyte cell of the present application.

Effects of the Invention

The present application can provide a sheet-type cell with excellent storage characteristics and a negative electrode that can constitute the sheet-type cell.

BRIEF DESCRIPTION OF DRAWING

FIG. 1 is a plan view schematically illustrating an example of a negative electrode for an aqueous electrolyte cell as an embodiment.

FIG. 2 is a plan view schematically illustrating an example of a sheet-type cell as an embodiment.

FIG. 3 is a cross-sectional view taken along the line I-I of FIG. 2.

Figure 4:
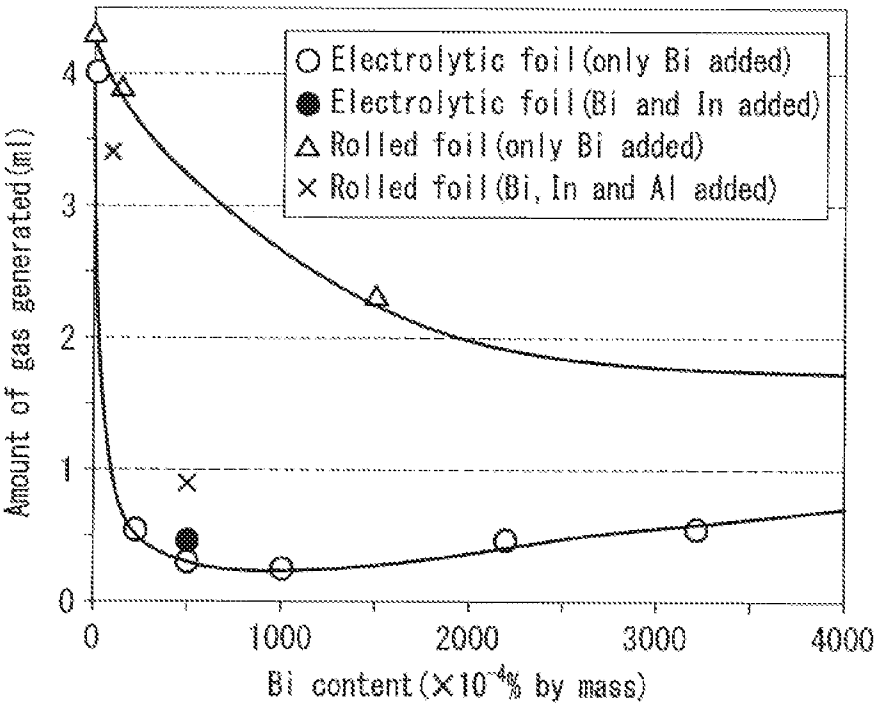
FIG. 4 is a graph showing the results of the gas generation measurement test on electrolytic zinc foils and rolled zinc foils of the examples.

DESCRIPTION OF THE INVENTION (Negative Electrode for Aqueous Electrolyte Cell)

One embodiment of a negative electrode for an aqueous electrolyte cell of the present application will be described. A negative electrode of this embodiment is used for a cell including an aqueous electrolyte solution and has an active material layer made of an electrolytic zinc foil.

Zinc foils (including zinc alloy foils) can be classified into different types such as a rolled zinc foil and an electrolytic zinc foil according to their production methods. The present inventors have studied to find that the generation of gas due to the corrosion of zinc in a cell was more easily reduced by using the electrolytic zinc foil than by using the rolled zinc foil as an active material layer of the negative electrode. The reason for this is not clear, but may be attributed to the fact that the electrolytic zinc foil and the rolled zinc foil differ in the state of crystal grain (e.g., grain size) of metal (or alloy), and in particular when the zinc foil contains additional elements, the additional elements are likely to be uniformly distributed in the electrolytic zinc foil compared to the rolled zinc foil.

As described above, the negative electrode of this embodiment can reduce the generation of gas in a cell. Thus, the use of the negative electrode of this embodiment in a cell including an aqueous electrolyte solution can improve the storage characteristics of the cell. Moreover, if Zn (zinc) that serves as a negative electrode active material is consumed by corrosion, it cannot participate in the discharge reaction. Therefore, the use of the negative electrode of this embodiment can reduce the consumption of Zn by corrosion, and can also prevent a reduction in capacity of the cell.

On the other hand, the electrolytic zinc foil containing additional elements may become harder and more brittle than the rolled zinc foil, depending on the type of the additional elements. For this reason, there may be a problem of cracks or the like in the foil, e.g., during the production of the negative electrode. Thus, a preferred embodiment of the electrolytic zinc foil (such as the composition of zinc alloy) for the negative electrode is considered to be different from that of the rolled zinc foil.

The electrolytic zinc foil may be composed of either Zn (and inevitable impurities) or Zn alloy. However, the electrolytic zinc foil composed of Zn alloy containing additional elements is more preferred because, e.g., the generation of gas in the cell can be reduced more effectively.

The Zn alloy of the electrolytic zinc foil preferably contains Bi in terms of the effort reducing the generation of gas.

From the viewpoint of more satisfactorily ensuring the above effect due to the presence of Bi, the proportion of Bi in the Zn alloy of the electrolytic zinc foil is preferably 0.001% by mass or more, more preferably 0.01% by mass or more, and most preferably 0.02% by mass or more. However, the higher the Bi content is, the greater the reaction resistance during discharge of the negative electrode and the lower the operating voltage of the cell become. Consequently, the effect of reducing the generation of gas may be degraded. Therefrom, the proportion of Bi in the Zn alloy of the electrolytic zinc foil is preferably 0.2% by mass or less, more preferably 0.1% by mass or less, and most preferably 0.07% by mass or less.

When zinc is in the form of particles, In is also generally used as an additional element because In as well as Bi contributes to a reduction of the generation of gas from the negative electrode in the cell. However, In also has the effect of increasing the hardness of the electrolytic zinc foil. If the amount of In in the Zn alloy is too large, the resulting foil becomes hard and brittle. This can reduce the productivity of the negative electrode and the flexibility of the cell that is formed into a sheet. Therefore, the electrolytic zinc foil should not contain In. If the electrolytic zinc foil contains In, the proportion of In in the Zn alloy of the electrolytic zinc foil is preferably 0.04% by mass or leas, and more preferably 0.02% by mass or less.

The electrolytic zinc foil may contain elements such as Al, Mg, Ca, and Sr as additional elements (alloy elements) other than Bi and In. The total proportion of the alloy elements other than Bi and In in the Zn alloy is preferably 0.1% by mass or less, and more preferably 0.05% by mass or less.

The thickness of the electrolytic zinc foil is preferably 10 μm or more, and more preferably 30 μm or more in terms of, e.g., discharge capacity. The thickness of the electrolytic zinc foil is also preferably 1000 μm or less, and more preferably 500 μm or less in terms at e.g., flexibility.

The electrolytic zinc foil of the negative electrode of this embodiment can be produced by conventionally known method. The electrolytic zinc foil generally has a smaller grain size than the rolled zinc foil, and the side of the electrolytic zinc foil that comes into contact with an electrode drum (which is opposite to the side of the electrolytic zinc foil that is to be plated) tends to be smoother than the side to be plated. Thus, the electrolytic zinc foil can be distinguished from the rolled zinc foil by, e.g., SEM (scanning electron microscope) observation or the measurement of surface roughness.

The negative electrode of this embodiment has, e.g., a main body that functions as a negative electrode active material layer made of the electrolytic zinc foil. To produce the negative electrode, a lead may optionally be attached to the main body by, e.g., welding so that the main body can be connected to a negative electrode external terminal of the cell (i.e., the terminal of the negative electrode for making a connection with a device that will use the cell). Moreover, the negative electrode may be produced by attaching the negative electrode external terminal itself rather than the lead to the main belly by, e.g., welding.

The lead and the negative electrode external terminal may be made of foil (plate) or wire of metal, which will be described later as materials for forming, e.g., a negative electrode anent collector. The lead and the negative electrode external terminal in the form of foil (plate) preferably have a thickness of 20 μm or more and 500 μm or less. The lead and the negative electrode external terminal in the form of wire preferably have a diameter of 50 μm or more and 1500 μm or less.

The lead and the negative electrode external terminal may also be composed of any conductive material other than the metal material. A carbon material can be used as well. For example, a carbon paste can be applied and dried to firm the lead and the negative electrode external terminal.

The electrolytic zinc foil may be cut into a shape including both the main body and the lead or the negative electrode external terminal. In this manner, the negative electrode can be formed from one electrolytic zinc foil. Thus, the cell may have the negative electrode in which the main body and the lead or the negative electrode external terminal are combined by using the same electrolytic zinc foil. In view of improving productivity of the negative electrode, it is more preferable that the negative electrode is produced by cutting one electrolytic zinc foil into a shape including both the main body and the lead or the negative electrode external terminal.

FIG. 1 is a plan view schematically illustrating an example of the negative electrode of this embodiment. As shown in FIG. 1, a negative electrode 10 includes a main body 11 that functions as a negative electrode active material, and a negative electrode external terminal 12. The main body 11 and the negative electrode external terminal 12 are firmed by one electrolytic zinc foil.

The negative electrode may include a current collector as needed. The current collector of the negative electrode may be, e.g., a mesh, foil, expanded metal, or punched metal made of metals such as nickel, copper, and stainless steel or may be, e.g., a sheet or mesh made of carbon. The thickness of the current collector of the negative electrode is preferably 10 μm or more and 300 μm or less.

(Sheet-Type Cell)

One embodiment of a sheet-type cell of the present application will be described. A sheet-type cell of this embodiment includes a sheet-type outer case and a power generation element contained in the sheet-type outer case. The power generation element includes a positive electrode, a negative electrode, a separator, and an aqueous electrolyte solution. The negative electrode is the negative electrode for an aqueous electrolyte cell of the present application.

The sheet-type cell of this embodiment may include various types of cells (such as alkaline mills (alkaline primary cell and alkaline secondary cell), manganese cells, and air cells) having an aqueous electrolyte solution, i.e., an electrolyte solution composed of an aqueous solution that contains water as a solvent.

Hereinafter, the power generation element except for the negative electrode and the sheet-type outer case of the sheet-type cell of this embodiment will be described.

<Positive Electrode>

When the sheet-type cell is an alkaline cell or a manganese cell, a positive electrode may have a structure in which a positive electrode mixture layer containing, e.g., a positive electrode active material, a conductive assistant, and a binder is formed on one side or both sides of a current collector.

When the sheet-type cell is an alkaline cell, the examples of the positive electrode active material may include silver oxides (such as silver (I) oxide and silver (II) oxide), manganese oxides such as manganese dioxide, nickel oxyhydroxide, and composite oxides of silver and cobalt, nickel, or bismuth. When the sheet-type cell is a manganese cell, the examples of the positive electrode active material may include manganese oxides such as manganese dioxide.

The examples of the conductive assistant of the positive electrode mixture layer may include the following: carbon materials such as carbon blacks of acetylene blank, Ketjenblack, channel black, furnace black, lamp black, thermal black, etc. and carbon fibers; conductive fibers such as metallic fibers; carbon fluoride; metal powders of copper, nickel, etc.; and organic conductive materials such as polyphenylene derivatives.

The examples of the binder of the positive electrode mixture layer may include the following: polyvinylidene fluoride (PVDF), polytetrafluoroethylene (PTFE), styrene butadiene rubber (SBR), carboxymethyl cellulose (CMC), and polyvinylpyrrolidone (PVP).

In the composition of the positive electrode mixture layer, the amount of the positive electrode active material is preferably 80 to 98% by mass, the content of the conductive assistant is preferably 1.5 to 10% by mass, and the content of the binder is preferably 0.5 to 10% by mass. The thickness of the positive electrode mixture layer is preferably 30 to 300 μm (per one side of the current collector).

The positive electrode having the positive electrode mixture layer can be produced in the following manner. For example, the positive electrode active material, the conductive assistant, and the binder are dispersed in water or an organic solvent such as N-methyl-2-pyrrolidone (NMP) to prepare a positive electrode mixture containing composition, e.g., in the form of slurry or paste (in this case, the binder may be dissolved in the solvent). This composition is applied on the current collector, dried, and optionally subjected to pressing such as calendering.

When the sheet-type cell is an air cell, the positive electrode (air electrode) has a catalyst layer. For example, the positive electrode with a laminated structure of the catalyst layer and the current collector may be used.

The catalyst layer may contain, e.g., a catalyst and a binder.

The examples of the catalyst of the catalyst layer may include the following: silver, platinum metals or alloys thereof transition metals; platinum/metal oxides such as $Pt/IrO_2$; perovskite oxides such as $La_{1-x}Ca_xCoO_3$; carbides such as WC; nitrides such as $Mn_4N$; manganese oxides such as manganese dioxide; and carbon (including, e.g., graphite, carbon black (acetylene black, Ketjenblack, channel black, furnace black, lamp black, thermal black, etc.), charcoal, and activated carbon). These catalysts may be used alone or in combinations of two or more.

The heavy metal content in the catalyst layer is preferably 1% by mass or less. The sheet-type cell of this embodiment can be torn, e.g., by hand and easily broken for disposal. When the positive electrode has the catalyst layer with a low heavy metal content, the environmental impact can be reduced even if the cell is disposed of without any special treatment.

In this specification, the heavy metal content in the catalyst layer can be measured by X-ray fluorescence analysis. For example, the measurement can be performed using "ZSX100e" manufactured by Rigaku Corporation under the following conditions: excitation source, Rh 50 kV; and analysis area, φ10 mm.

It is recommended that the catalyst of the catalyst layer should contain on heavy metal, but preferably contain the various types of carbon as described above.

In terms of further improving the reactivity of the positive electrode, the specific surface area of the carbon that is used as the catalyst is preferably 200 $m^2/g$ or more, more preferably 300 $m^2/g$ or more, and further preferably 500 $m^2/g$ or more. In this specification, the specific surface area of the carbon is determined by a BET method in accordance with the Japanese Industrial Standards (JIS) K 6217. For example, the specific surface area of the carbon can be measured with a specific surface area measuring device ("Macsorb HM model-1201" manufactured by Mountech Co., Ltd.) based on a nitrogen adsorption method. The upper limit of the specific surface area of the carbon is usually about 2000 $m^2/g$.

The content of the catalyst in the catalyst layer is preferably 20 to 70% by mass.

The examples of the binder of the catalyst layer may include fluorocarbon resin binders such as PVDF, PTFE, copolymers of vinylidene fluoride, and copolymers of tetrafluoroethylene (including, e.g., a vinylidene fluoride-hexafluoropropylene copolymer (PVDF-HFP), a vinylidene fluoride-chlorotrifluoroethylene copolymer (PVDF-TFE), a vinylidene fluoride-tetrafluoroethylene copolymer (PVDF-TFE), and a vinylidene fluoride-hexafluoropropylene-tetraftuoroethylene copolymer (PVDF-HFP-TFE)). Among them, polymers of tetrafluoroethylene (PTFE) or copolymers of tetrafluoroethylene are preferred, and PTFE is more preferred. The content of the binder in the catalyst layer is preferably 3 to 50% by mass.

The positive electrode having the catalyst layer can be produced by, e.g., mixing the above catalyst, binder, or the like with water, followed by rolling the mixture between rotating rolls, and bringing the rolled material into close contact with the current collector. There may be another way of producing the positive electrode. First, a composition (slurry, paste, etc.) for forming a catalyst layer is prepared by dispersing the above catalyst and optionally the binder or the like in water or an organic solvent. Then, the composition is applied on the surface of the current collector and dried, which is further subjected to pressing (e.g., calendering) as needed.

The catalyst layer may be a porous carbon sheet made of fibrous carbon such as carbon paper, carbon cloth, or carbon felt. The carbon sheet can also be used as a current collector of the positive electrode, as will be described later. The carbon sheet can serve as both the catalyst layer and the current collector.

The current collector of the positive electrode having the catalyst layer or the positive electrode mixture layer may be, e.g., a mesh, foil, expanded metal or punched metal made of metals such as titanium, nickel, stainless steel, and copper; or may be, e.g., a mesh or sheet made of carbon. The thickness of the current collector of the positive electrode is preferably 10 μm or more and 300 μm or less.

Moreover, a portion of the resin film constituting the sheet-type outer case may also be used as the current collector of the positive electrode. In such a case, e.g., the current collector can be provided by applying a carbon poste on the surface of the resin film that is to be the inner surface of the sheet-type outer case. Alternatively, when the resin film has a metal layer, the metal layer can also serve as the anent collector. Then, the positive electrode mixture layer or the catalyst layer can be framed on the surface of the current collector in the same manner as described above, thus producing the positive electrode. The thickness of the carbon paste layer is preferably 30 to 300 μm.

The positive electrode generally has a positive electrode external terminal. The positive electrode external terminal may be formed by connecting, e.g., aluminum foil (plate) or wire or nickel foil (plate) or wire either directly or through a lead to the current collector of the positive electrode. The positive electrode external terminal in the form of foil (plate) preferably has a thickness of 50 μm or more and 500 μm or less. The positive electrode external terminal in the form of wire preferably has a diameter of 100 μm or more and 1500 μm or less.

Moreover, a portion of the current collector of the positive electrode may be exposed to the outside and used as the positive electrode external terminal.

<Separator>

In the sheet-type cell, the separator is interposed between the positive electrode and the negative electrode. When the sheet-type cell is an alkaline cell, a manganese cell, or an air cell, the examples of the separator may include a nonwoven fabric mainly composed of vinylon and rayon, a vinylon-rayon nonwoven fabric (vinylon-rayon mixed paper), a polyamide nonwoven fabric, a polyolefin-rayon nonwoven fabric, vinylon paper, vinylon-linter pulp paper, and vinylon-mercerized pulp paper. Moreover, the separator may be a microporous film. Specifically, a microporous polyolefin film (e.g., microporous polyethylene film or microporous polypropylene film) can be used. The surface of the microporous film can be made hydrophilic to improve the wettability with the aqueous electrolyte solution.

The separator may be a laminated body of the microporous film, a cellophane film, and a liquid-absorbing layer an electrolyte solution holding layer) such as vinylon-rayon mixed paper. The separator preferably has a thickness of e.g., 10 to 500 μm. The thickness of the separator is preferably 10 to 50 μm for a microporous film and is preferably 20 to 500 μm for a nonwoven fabric.

<Electrolyte Solution>

The electrolyte solution of the sheet-type cell is an aqueous electrolyte solution containing water as a solvent. The pH of the aqueous electrolyte solution is preferably less than 12 from the viewpoint of reducing the environmental impact of the cell for disposal, and more preferably less than 7 from the viewpoint of more satisfactorily ensuring the elect of the negative electrode of this embodiment. To prevent the corrosion of the electrolytic zinc foil, in general, the pH of the aqueous electrolyte solution is preferably 3 or more, and more preferably 4 or more. When the sheet-type cell is an alkaline cell, the pH of the aqueous electrolyte solution can be as high as 12 or more, and even, e.g., 14 or more.

When the sheet-type cell is an alkaline cell, the aqueous electrolyte solution to be used may be an alkaline electrolyte solution. Specifically, the alkaline electrolyte solution may be, e.g., an alkaline aqueous solution composed of an aqueous solution of alkali metal hydroxide such as potassium hydroxide, sodium hydroxide, or lithium hydroxide. The alkaline electrolyte solution may also be obtained by adding zinc oxide to the alkaline aqueous solution. The concentration of the alkali metal hydroxide in the alkaline electrolyte solution is preferably 28 to 38% by mass in the case of e.g., potassium hydroxide. When the alkaline electrolyte solution contains zinc oxide, the concentration of the zinc oxide is preferably 1.0 to 4.0% by mass.

When the sheet-type cell is an air cell or a manganese cell, the aqueous electrolyte solution to be used may be an aqueous solution in which an electrolyte salt or the like is dissolved in water. The examples of the electrolyte salt may include the following: chlorides such as sodium chloride, potassium chloride, magnesium chloride, calcium chloride, ammonium chloride, and zinc chloride; hydroxides of alkali metals or alkaline-earth metals (e.g., sodium hydroxide, potassium hydroxide, and magnesium hydroxide), acetates of these metals (e.g., sodium acetate, potassium acetate, and magnesium acetate), nitrates of these metals (e.g., sodium nitrate, potassium nitrate, and magnesium nitrate), sulfates of these metals (e.g., sodium sulfate, potassium sulfate, and magnesium sulfate), phosphates of these metals (e.g., sodium phosphate, potassium phosphate, and magnesium phosphate), borates of these metals (e.g., sodium borate, potassium borate, and magnesium borate), citrates of these metals (e.g., sodium citrate, potassium citrate, and magnesium citrate), and glutamates of these metals (e.g., sodium glutamate, potassium glutamate, and magnesium glutamate); hydrogencarbonates of alkali metals (e.g., sodium hydrogencarbonate and potassium hydrogencarbonate); percarbonates of alkali metals (e.g., sodium percarbonate and potassium percarbonate); compounds containing halogens such as fluorides; and polycarboxylic acids. The aqueous electrolyte solution may contain either one or two or more of these electrolyte salts.

When the sheet-type cell is an air cell, the pH of the aqueous electrolyte solution is preferably less than 12 (and more preferably less than 7), as described above. If the electrolyte salt affects the pH in preparing an aqueous solution for the aqueous electrolyte solution, it is preferable that the concentration of the electrolyte salt is adjusted so that the pH of the aqueous electrolyte solution is within the above range.

When the sheet-type cell is an air cell, the aqueous electrolyte solution is more preferably an aqueous solution of chloride such as a sodium chloride aqueous solution. For example, the concentration of the sodium chloride in the sodium chloride aqueous solution is preferably 1 to 23% by mass.

When the sheet-type cell is an air cell, the composition of the electrolyte solution is likely to change because water in the aqueous electrolyte solution evaporates and dissipates through the air holes. Therefore, to avoid this problem, a water-soluble high-boiling solvent with a boiling point of 150° C. or more (and preferably 320° C. or less) can be used along with water as a solvent of the aqueous electrolyte solution. Alternatively, a thickening agent may be mixed with the aqueous electrolyte solution, and more preferably the aqueous electrolyte solution may be gelled (to form a gel electrolyte).

The examples of the water-soluble high-boiling solvent may include the following: polyhydric alcohols such as ethylene glycol (boiling point: 197° C.), propylene glycol (boiling point: 188° C.), and glycerol (boiling point: 290° C.; and polyalkylene glycol (having a molecular weight of preferably 600 or less) such as polyethylene glycol (PEG, e.g., boiling point: 230° C.). The proportion of the water-soluble high-boiling solvent in the total solvent is preferably 3 to 30% by mass.

The use of the aqueous electrolyte solution composed of an aqueous solution may cause problems such that the negative electrode containing the electrolytic zinc foil as an active material layer will be broken due to corrosion by the aqueous electrolyte solution, and the capacity of the negative electrode cannot be fully drawn. However, when mixing the thickening agent with the aqueous electrolyte solution, and more preferably gelling the aqueous electrolyte solution (to form a gel electrolyte), not only the change in the composition of the electrolyte solution can be avoided, but also the unwanted corrosion reaction the negative electrode can be reduced, thereby suppressing the generation of gas and the breakage of the negative electrode. The thickening agent that can be contained in the aqueous electrolyte solution may be any of various synthetic polymers or natural polymers. Specific examples of the thickening agent may include the following: cellulose derivatives such as carboxymethyl cellulose (CMC) and carboxyethyl cellulose (CEC); polyalkylene oxide (having a molecular weight of preferably 1000 or more, and more preferably 10000 or more) such as polyethylene oxide (PEO); polyvinylpyrrolidone, polyvinyl acetate; starch; guar gum; xanthan gum; sodium alginate; hyaluronic acid; gelatin; and polyacrylic acid. Moreover, in the above thickening agents, when the functional group including a carboxyl group or its salt (—COOH, —COONa, etc.) is present in the molecule, it is also preferable that a polyvalent metal salt serving as a gelation accelerator is added to the aqueous electrolyte solution. To enhance the above effects, the content of the thickening agent in the aqueous electrolyte solution is preferably 0.1% by mass or more, more preferably 1% by mass or more, and most preferably 3% by mass or more. On the other hand, to prevent a reduction in the discharge characteristics, the content of the thickening agent in the aqueous electrolyte solution is preferably 20% by mass or less, more preferably 15% by mass or less, and most preferably 10% by mass or less. When the gelation accelerator is used, the content of the gelation accelerator is preferably 1 to 30 with respect to 100 of the thickening agent at a mass ratio.

When the sheet-type cell is a manganese cell, the aqueous electrolyte solution to be used is preferably an aqueous solution of zinc chloride. The concentration of the zinc chloride is preferably 10 to 40% by mass.

The aqueous electrolyte solution may be gelled (to form a gel electrolyte) by using a gelling agent such as a known polymer.

<Sheet-Type Outer Case Member>

The sheet-type outer case of the sheet-type cell may be formed of a resin film. The examples of the resin film may include a nylon film (such as a nylon 66 film) and a polyester film (such as a polyethylene terephthalate (PET) film).

The sheet-type outer case is generally sealed by heat-sealing the edge of the upper resin film and the edge of the lower resin film of the sheet-type outer case. To further facilitate the heat seal, a heat-sealing resin layer may be stacked on each of the resin films and used for the sheet-type outer case. The heat-sealing resin of the heat-sealing resin layer may be, e.g., a modified polyolefin (such as a modified polyolefin ionomer) or polypropylene and its copolymer. The thickness of the heat-sealing resin layer is preferably 20 to 200 μm.

Moreover, a metal layer may be formed on the resin film. The metal layer may be of, e.g., an aluminum film (including aluminum foil and aluminum alloy foil) or a stainless steel film (including stainless steel foil). The thickness of the metal layer is preferably 10 to 150 μm.

The resin film of the sheet-type outer case may be, e.g., a laminated film of the heat-sealing resin layer and the metal layer.

Moreover, the resin film of the sheet-type outer case preferably has an electrically insulating moisture barrier layer. In this case, the resin film may have either a single layer structure or a multilayer structure. The single layer structure includes an electrically insulating resin film that also selves as a moisture barrier layer. The multilayer structure includes a plurality of electrically insulating resin films at least one of which serves as a moisture barrier layer. Alternatively, the multilayer structure may include a base material layer made of a resin film and an electrically insulating moisture barrier layer formed on the surface of the base material layer.

The preferred resin film has a structure in which the moisture barrier layer composed of at least an inorganic oxide is formed on the surface of the base material layer made of a resin film.

The examples of the inorganic oxide of the moisture barrier layer may include aluminum oxide and silicon oxide. The moisture barrier layer composed of silicon oxide tends to be superior to that comprised of aluminum oxide in the function of suppressing the permeation of water contained in the electrolyte solution of the cell. For this reason, the inorganic oxide of the moisture barrier layer is more preferably silicon oxide.

The moisture barrier layer composed of the inorganic oxide can be formed on the surface of the base material layer by, e.g., an evaporation method. The thickness of the moisture barrier layer is preferably 10 to 300 nm.

The base material layer made of a resin film, which has the moisture barrier layer, may be, e.g., a polyolefin film, a polyimide film, or a polycarbonate film, in addition to the nylon film and the polyester film as described above. The thickness of the base material layer is preferably 5 to 100 μm.

When the resin film includes the moisture barrier layer and the base material layer, a protective layer for protecting the moisture barrier layer may be formed on the surface of the moisture barrier layer (which is opposite to the base material layer).

The heat-sealing resin layer may further be formed an the resin film that includes the moisture barrier layer and the base material layer.

The total the of the resin film is preferably 10 μm or more in terms of, e.g., imparting sufficient strength to the sheet-type cell and 200 μm or less in terms of suppressing an increase in the thickness of the sheet-type cell and a decrease in the energy density of the sheet-type cell.

The moisture permeability of the resin film of the sheet-type outer case is preferably 10 $g/m^2 \cdot 24$ h or less. It is desirable that the resin film is not permeable to moisture as much as possible. In other words, the moisture permeability of the resin film is preferably as small as possible and may be 0 $g/m^2 \cdot 24$ h.

In this specification, the moisture permeability of the resin film is a value measured by a method in accordance with JIS K 7129B.

When the sheet-type cell is an air cell, it is preferable that the resin film of the sheet-type outer case has same degree of oxygen permeability. The air cell is discharged by supplying air (oxygen) to the positive electrode. Therefore, the sheet-type outer case has air holes through which oxygen is introduced into the cell. If the resin film of the sheet-type outer case is permeable to oxygen, the oxygen can also be introduced into the cell through the portion of the sheet-type outer case other than the air holes. As a result, the oxygen can be supplied more uniformly over the entire positive electrode. Thus, the discharge characteristics of the cell can be improved and the discharge time can be made longer. Moreover, the sheet-type air cell can have a sheet-type outer case without air holes.

When the sheet-type cell is an air cell, the specific oxygen permeability of the resin film of the sheet-type outer case is preferably 0.02 $cm^3/m^2$-24 h·MPa or more, and more preferably 0.2 $cm^3/m^2 \cdot 24$ h·MPa or more. However, if the resin film of the sheet-type outer case allows too much oxygen to pass through it, self-discharge of the air cell may occur, leading to the loss of capacity. Therefore, the oxygen permeability of the resin film is preferably 100 $cm^3/m^2 \cdot 24$ h·MPa or less, and more preferably 50 $cm^3/m^2 \cdot 24$ h·MPa or less.

On the other hand, when the sheet-type cell is a cell other than the air cell, the oxygen permeability of the resin film of the sheet-type outer case is not particularly limited. However, it is preferable that the resin film is not much permeable to oxygen in terms of improving the storage characteristics of the cell. The specific oxygen permeability of the resin film is preferably 10 $cm^3/m^2 \cdot 24$ h·MPa or less.

In this specification, the oxygen permeability of the resin film is a value measured by a method in accordance with JIS K7126-2.

Next, the sheet-type cell of this embodiment will be described with reference to the drawings.

FIGS. 2 and 3 schematically illustrate an example of the sheet-type cell of this embodiment In the example of FIGS. 2 and 3, the sheet-type cell is an air cell FIG. 2 is a plan view of the sheet-type cell and FIG. 3 is a cross-sectional view taken along the line I-I in FIG. 2.

As shown in FIG. 3, a sheet-type cell 1 includes a sheet-type outer case 50, in which a negative electrode 10, a separator 30, a positive electrode 20, and an aqueous electrolyte solution (not shown) are contained. In FIG. 2, the dotted line represents the size of the positive electrode 20 (corresponding to the size of a wide main body other than a positive electrode external terminal, i.e., the size of a catalyst layer of the positive electrode) contained in the sheet-type outer case 50.

A negative electrode external terminal 12 of the negative electrode 10 and a positive electrode external terminal 22 of the positive electrode 20 protrude from the upper side of the sheet-type outer case 50 in FIG. 2. The external terminals 12, 22 are used to electrically connect the sheet-type cell 1 to the applicable equipment.

The sheet-type outer case 50 has a plurality of air holes 51 on the side where the positive electrode 20 is provided so as to take air into the positive electrode. Moreover, a water repellent membrane 40 is provided on the surface of the positive electrode 20 that faces the sheet-type outer case 50 to prevent leakage of the aqueous electrolyte solution through the air holes 51.

The positive electrode 20 has a catalyst layer and has, e.g., a laminated structure of the catalyst layer and the current collector, as described above. For the purpose of brevity, the individual layers of the positive electrode 20 are not distinguished from each other in FIG. 3. As shown in FIG. 3, the sheet-type outer case 50 (i.e., the resin film constituting the sheet-type outer case) has a single layer structure. The resin film of the sheet-type outer case 50 may also have a multilayer structure, as described above.

When the sheet-type cell is an air cell, the water repellent membrane is placed between the positive electrode and the outer case, as shown in FIG. 3. The water repellent membrane has not only water repellency, but also air permeability. Specific examples of the water repellent membrane may include a membrane made of resin such as fluororesin (e.g., PTFE) or polyolefins (e.g., polypropylene and polyethylene). The thickness of the water repellent membrane is preferably 10 to 250 μm.

When the sheet-type cell is an air cell, an air diffusion membrane may be provided between the outer case and the water repellent membrane. The air diffusion membrane serves to supply the air that has been taken into the outer case to the positive electrode. The air diffusion membrane may be, e.g., a nonwoven fabric made of resin such as cellulose, polyvinyl alcohol, polypropylene, or nylon. The thickness of the air diffusion membrane is preferably 100 to 250 μm.

The thickness of the sheet-type cell (i.e., the length indicated by a in FIG. 3) is not particularly limited and may be appropriately changed depending on the use of the sheet-type cell. One of the advantages of the cell having the sheet-type outer case (i.e., the sheet-type cell) is that the thickness can be reduced. In view of this, the thickness of the sheet-type cell is preferably, e.g., 1 mm or less. When the sheet-type cell is an air cell, it is particularly easy to provide such a thin cell.

The lower limit of the thickness of the sheet-type cell is not particularly limited and may usually be 0.2 mm or more to maintain a predetermined amount of capacity.

The sheet-type cell of this embodiment can be used for the same purposes as conventionally known various sheet-type cells. In particular, the sheet-type cell of this embodiment is suitable as a power source for medical and health equipment, including a wearable patch, e.g., a patch that can be attached to the surface of the skin to measure information about body conditions such as body temperature, pulse, and perspiration. The negative electrode of this embodiment can be used in various cells including the aqueous electrolyte solution, and is particularly suitable as a negative electrode of a sheet-type cell.

EXAMPLES

Hereinafter, the sheet-type cell of the present application will be described in detail based an examples. However, the sheet-type cell of the present application is not limited to the following examples.

Electrolytic zinc foils, each of which had a thickness of 50 μm and the composition shown in Table 1, and rolled zinc foils, each of which had a thickness of 50 μm and the composition shown in Table 2, were prepared. Using these electrolytic zinc foils and rolled zinc foils, a flexibility evaluation test and a gas generation measurement test were performed. The electrolytic zinc his and the rolled zinc ids contained inevitable impurities other than Zn and the elements shown in the tables.

TABLE 1

| | Content of additional elements ($\times10^{-4}$ % by mass) | | |
|---|---|---|---|
| | Bi | In | Al |
| Electrolytic zinc foil A | 20 | 0 | 0 |
| Electrolytic zinc foil B | 220 | 0 | 0 |
| Electrolytic zinc foil C | 500 | 0 | 0 |
| Electrolytic zinc foil D | 500 | 800 | 0 |
| Electrolytic zinc foil E | 1000 | 0 | 0 |
| Electrolytic zinc foil F | 2190 | 0 | 0 |
| Electrolytic zinc foil G | 3210 | 0 | 0 |
| Electrolytic zinc foil H | 6440 | 0 | 0 |

TABLE 2

| | Content of additional elements ($\times10^{-4}$ % by mass) | | |
|---|---|---|---|
| | Bi | In | Al |
| Rolled zinc foil K | 0 | 0 | 0 |
| Rolled zinc foil L | 100 | 200 | 100 |
| Rolled zinc foil M | 150 | 0 | 0 |
| Rolled zinc foil N | 500 | 1000 | 100 |
| Rolled zinc foil O | 1500 | 0 | 0 |
| Rolled zinc foil P | 8000 | 0 | 0 |

[Flexibility Evaluation Test]

The electrolytic zinc foil C, the electrolytic zinc foil D, the rolled zinc foil K, the rolled zinc foil N, and the rolled zinc foil O were each cut into 30 mm×15 mm to prepare evaluation samples. Then, each of the evaluation samples was bent at 90 degrees in the middle in the longitudinal direction and was checked for the presence or absence of cracks in the central portion.

Next, each of the evaluation samples was further bent so that both sides were in contact with each other (i.e., bending at 180 degrees) and was checked for the presence or absence of cracks in the central portion.

Subsequently, each of the evaluation samples was bent to the opposite side so that both sides were in contact with each other (i.e., bending at 180 degrees in the opposite direction) and was checked for the presence or absence of cracks in the central portion.

For the electrolytic zinc foil C, the rolled zinc foil K, and the rolled zinc foil O, no cracks were observed in any of the above bending stages. The electrolytic zinc foil D, containing $800\times10^{-4}$% by mass (800 ppm) of In, was broken when it was bent at 90 degrees. The rolled zinc N, containing $1000\times10^{-4}$% by mass (1000 ppm) of In, was broken when it was bent at 180 degrees in the opposite direction.

The results confirmed that, since the flexibility of the electrolytic zinc foil is likely to be reduced by the presence of In, the In content should be low in order to ensure the productivity of the negative electrode and to make the sheet-shaped cell flexible.

[Gas Generation Measurement Test]

The electrolytic zinc foils A to H and the rolled zinc kits K to P were each cut into 60 mm×20 mm. Then, a 5-mm wide portion along the edge on both sides of each zinc foil and the cutting plane were covered with an adhesive tape, thereby firming an exposed portion of 50 mm×10 mm in the center of both sides of zinc foil. Thus, evaluation samples were prepared.

The evaluation samples were configured so that only the exposed portions of the zinc foil were brought into contact with the electrolyte solution. Each of the evaluation samples was immersed in 15 g of the electrolyte solution containing a 20% by mass aqueous solution of ammonium chloride, and then maintained in a temperature environment of 60° C. for 24 hours. The amount of hydrogen gas generated during this period was measured.

Table 3 shows the measurement results. FIG. 4 shows the results of the zinc foils with a Bi content of $4000\times10^{-4}$% by mass (4000 ppm) or less.

TABLE 3

| | Amount of gas generated (ml) |
|---|---|
| Electrolytic zinc foil A | 4 |
| Electrolytic zinc foil B | 0.53 |
| Electrolytic zinc foil C | 0.3 |
| Electiolytic zinc foil D | 0.42 |
| Electrolytic zinc foil E | 0.24 |
| Electrolytic zinc foil F | 0.46 |
| Electrolytic zinc foil G | 0.54 |
| Electrolytic zinc foil H | 0.85 |
| Rolled zinc foil K | 4.3 |
| Rolled zinc foil L | 3.4 |
| Rolled zinc foil M | 3.9 |
| Rolled zinc foil N | 0.89 |
| Rolled zinc foil O | 2.32 |
| Rolled zinc foil P | 1.58 |

In the electrolytic zinc foil, the amount of hydrogen gas generated was significantly reduced because of the addition of Bi, as compared to the rolled zinc foil. The results clearly showed that the use of the electrolytic zinc foil as a negative electrode active material later to form a cell can greatly improve the storage characteristics of the cell. On the other hand, in the rolled zinc foil, the effect of the addition of Bi was limited, while In was more effective in reducing the amount of hydrogen gas generated. Thus, it was build that a preferred embodiment of the rolled zinc foil differs from that of the electrolytic zinc foil.

[Discharge Characteristic Evaluation Test]

Next, sheet-type cells were assembled using the electrolytic zinc foils A to C and E to G, and the discharge characteristics of the sheet-type cells were evaluated.

Example 1

<Negative Electrode>

The electrolytic zinc foil A was cut into a shape shown in FIG. 1 (the size of the main body: 15 mm long×15 mm wide, the size of the negative electrode external terminal; 5 mm wide×15 mm long). Thus, a negative electrode for an aqueous electrolyte cell was produced.

<Positive Electrode>

A composition for forming a catalyst layer was prepared by mixing 100 parts by mass of carbon black ("Ketjenblack EC600JD (trade name)" manufactured by Lion Specialty Chemicals Co., Ltd) with a DBP oil absorption of 405 $cm^3$/100 g and a specific surface area of 1270 $m^2$/g, 1 part by mass of phthalocyanine metal complex, 25 parts by mass of a dispersing agent, and 5000 parts by mass of ethanol.

Using porous carbon paper (thickness: 0.25 mm, porosity: 75%, air permeability (Gurley): 70 sec/100 ml) as a current collector, the composition for forming a catalyst layer was applied to the surface of the current collector by stripe coating so that the coating amount after drying was 10 $mg/cm^2$. Then, the composition was dried, resulting in the current collector that had a portion in which the catalyst layer was formed and a political in which no catalyst layer was formed. This current collector was punched into a shape including the portion with the catalyst layer that was 15 mm×15 mm in size and the portion without the catalyst layer that was 5 mm×15 mm in size. The portion without the catalyst layer was located at one end of the above portion of 15 mm×15 mm and was to be a positive electrode external terminal. Thus, a positive electrode (air electrode) with a total thickness of 0.27 mm was produced.

<Separator>

A graft film (thickness: 30 μm) was disposed an one side of a cellophane film (thickness: 20 μm). The resulting film (total thickness: 50 μm) was used as a separator. In this case, the graft film was composed of a graft copolymer obtained by graft copolymerization of acrylic add with a polyethylene main chain.

<Water Repellent Membrane>

A water repellent membrane was a PE microporous film with a thickness of 75 μm.

<Aqueous Electrolyte Solution>

A 20% by mass aqueous solution of ammonium chloride (having a pH of 4.3, which was measured in an environment of 25° C. with a "LAQUA twin compact pH meter" manufactured by HORIBA, Ltd.) was prepared. Then, 8% by mass of polyoxyethylene (having an average molecular weight of 7000000) was dissolved in the ammonium chloride aqueous solution. The resulting solution was used as an aqueous electrolyte solution.

<Cell Assembly>

Two commercially available barrier films ("GL FILM" with a thickness of 67 μm, manufactured by Toppan Printing CO.), each of which was cut into 40 mm×35 mm, were prepared and used as outer case members.

Nine air holes, each having a diameter of about 0.2 mm, were formed in one of the outer case members that was to be located near the positive electrode. The air holes were arranged in a matrix of three columns and three rows and were spaced at regular intervals (i.e., the center-to-center distance of adjacent air holes was 10 mm in both vertical and horizontal directions). Then, the water repellent membrane was thermally fused to the inner surface of this outer case member with a hot-melt adhesive. In the other outer case member that was to be located near the negative electrode, a modified polyolefin ionomer film was attached in parallel with the side of the outer case member to a portion where the external terminals of the positive electrode and the negative electrode were to be arranged, in order to improve the sealing properties of the thermally fused portion between the external terminals and the outer case member.

The sheet-type outer case member having the water repellent membrane was put down, and then the positive electrode, the separator, and the negative electrode were formed in this order on the water repellent membrane of the outer case member. Moreover, the other outer case member was placed on top of them so that the modified polyolefin ionomer film was positioned on the leads of the positive electrode and the negative electrode. The separator was located with the cellophane film facing the negative electrode. Next, three sides of the two outer case members were thermally fused to each other, thus providing a bag-like outer case. After the aqueous electrolyte solution was injected through the opening of the bag-like outer case, the opening was sealed by thermal fusion, and consequently a sheet-type air cell was obtained.

Example 2

A sheet-type air cell was assembled in the same manner as Example 1 except that the electrolytic zinc foil B was used to produce a negative electrode for an aqueous electrolyte cell.

Example 3

A sheet-type air cell was assembled in the same manner as Example 1 except that the electrolytic zinc foil C was used to produce a negative electrode for an aqueous electrolyte cell.

Example 4

A sheet-type air cell was assembled in the same manner as Example 1 except that the electrolytic zinc foil E was used to produce a negative electrode for an aqueous electrolyte cell.

Example 5

A sheet-type air cell was assembled in the same manner as Example 1 except that the electrolytic zinc foil F was used to produce a negative electrode for an aqueous electrolyte cell.

Example 6

A sheet-type air cell was assembled in the same manner as Example 1 except that the electrolytic zinc foil G was used to produce a negative electrode for an aqueous electrolyte cell.

The discharge characteristics of the sheet-type air cells in Examples 1 to 6 were evaluated by the following method.

Figure 5:
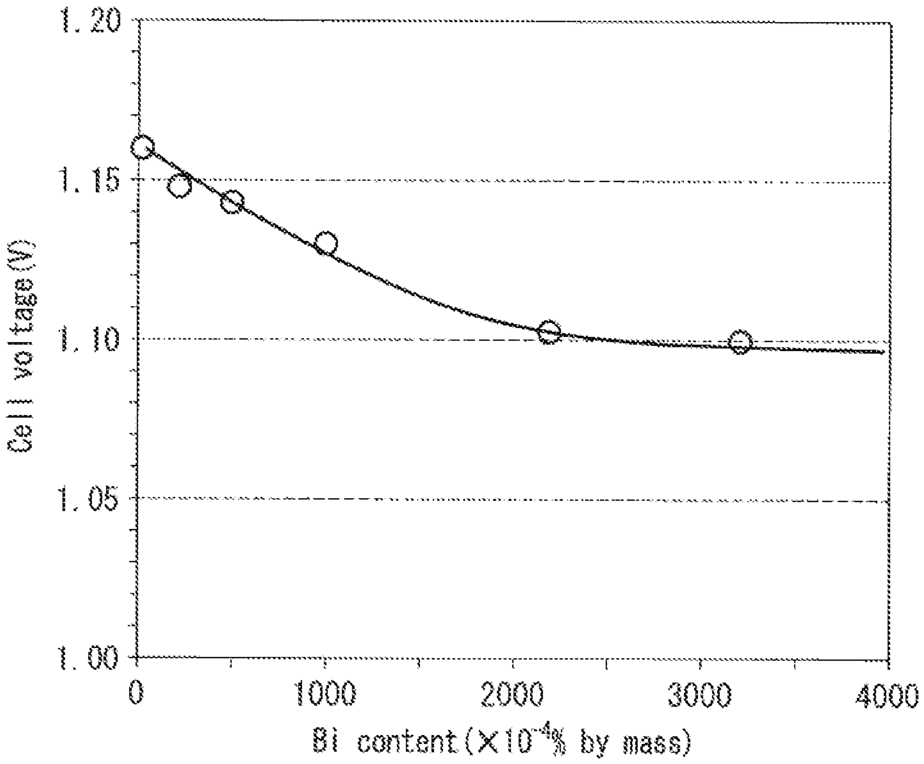
FIG. 5 is a graph showing the results of the discharge characteristic evaluation test on sheet-type air cells of the examples.

Each of the sheet-type air cells was connected to a discharge resistance of 3.9 kΩ and discharged. The cell voltage (CCV) was measured at the time the discharged electricity reached 10 mAh to evaluate the discharge characteristics. FIG. 5 shows the results.

As is evident from the results in FIG. 5, the higher the Bi content in the electrolytic zinc foil of the negative electrode, the greater the reaction resistance during discharge of the negative electrode and the lower the operating voltage of the cell. Therefore, the Bi content of the electrolytic zinc foil should be low in terms of the discharge characteristics of the cell.

[Storage Characteristic Evaluation Test]

Comparative Example 1

A sheet-type air cell was assembled in the same manner as Example 1 except that the rolled zinc foil M was used to produce a negative electrode for an aqueous electrolyte cell.

The storage characteristics of the sheet-type air cells in Examples 2 to 4 and Comparative Example 1 were evaluated under the following conditions.

An AC voltage of 1 kHz was applied to each of the sheet-type air cells in a room temperature environment to measure the internal resistance. Next, the sheet-type air cells were stared in a temperature environment of 40° C. in the atmosphere for 35 days, and then were cooled to room temperature. The internal resistance of each of the sheet-type air cells after storage was measured under the same conditions as described above. Further, each of the sheet-type air cells was connected to a discharge resistance of 3.9 kΩ and discharged. The discharge capacity was measured until the cell voltage was reduced to 1.0 V. Table 4 shows the measurement results.

TABLE 4

| | Internal resistance of cell (Ω) | | Discharge |
|---|---|---|---|
| | before storage | after storage | capacity after storage (mAh) |
| Example 2 | 6 | 10 | 47 |
| Example 3 | 5 | 8 | 55 |
| Example 4 | 6 | 10 | 51 |
| Comparative Example 1 | 6 | 16 | 37 |

The sheet-type air cells in Examples 2 to 4 include the negative electrode of this embodiment that has an active material layer made of the electrolytic zinc foil, and thus are superior in storage characteristics to the sheet-type air cell in Comparative Example 1 including the negative electrode that has an active material layer made of the rolled zinc foil.

The invention may be embodied in other forms without departing from the spirit or essential characteristics thereof. The embodiments disclosed in this application are to be considered in all respects as illustrative and not limiting. The scope of the invention is indicated by the appended claims rather than by the imaging description and all changes that come within the meaning and range of equivalency of the claims are intended to be embraced therein.

DESCRIPTION OF REFERENCE NUMERALS

1 Sheet-type cell
10 Negative electrode
11 Main body of negative electrode
12 Negative electrode external terminal

20 Positive electrode (air electrode)
22 Positive electrode external terminal
30 Separator
40 Water repellent membrane
50 Sheet-type outer case
51 Air hole

The invention claimed is:

1. A sheet-shaped cell comprising:
a sheet-shaped outer case that is flexible; and
a power generation element contained in the sheet-shaped outer case, the power generation element comprising:
a positive electrode;
a negative electrode;
a separator; and
an aqueous electrolyte solution, wherein
the negative electrode comprises an electrolytic zinc foil as an active material layer,
the electrolytic zinc foil is composed of zinc alloy containing 0.001% by mass or more of Bi as an alloy component,
the aqueous electrolyte solution is an aqueous solution which contains an electrolyte salt and has a pH of 4 or more and less than 12, or an alkaline electrolyte solution, and
wherein the sheet-shaped cell has a flexibility.

2. The sheet-shaped cell according to claim 1, wherein the aqueous electrolyte solution has a pH of less than 7.

3. The sheet-shaped cell according to claim 1, wherein the electrolytic zinc foil is composed of zinc alloy containing 0.002 to 0.644% by mass of Bi as an alloy component.

4. The sheet-shaped cell according to claim 1, wherein the electrolytic zinc foil does not contain In, or contains 0.04% by mass or less of In.

5. The sheet-shaped cell according to claim 1, wherein the sheet-shaped outer case is formed of a resin film comprising an electrically insulating moisture barrier layer composed of an inorganic oxide.

6. The sheet-shaped cell according to claim 1, wherein the positive electrode comprises a carbon sheet as a current collector.

7. The sheet-shaped cell according to claim 6, wherein the carbon sheet is a porous carbon sheet made of fibrous carbon.

8. The sheet-shaped cell according to claim 1, wherein the sheet-shaped cell is a primary cell.

9. The sheet-shaped cell according to claim 1, wherein the electrolytic zinc foil is composed of zinc alloy containing 0.2% by mass or less of Bi as an alloy component.

10. The sheet-shaped cell according to claim 1, wherein the negative electrode comprises a lead or a negative electrode external terminal, and
the lead or the negative electrode external terminal consists of a part of the electrolytic zinc foil.

11. The sheet-shaped cell according to claim 1, wherein one side of the electrolytic zinc foil is smoother than the other side.

12. The sheet-shaped cell according to claim 1, wherein the electrolytic zinc foil is composed of zinc alloy containing 0.01% by mass or more of Bi as an alloy component.

13. A sheet-shaped cell comprising:
a sheet-shaped outer case that is flexible; and
a power generation element contained in the sheet-shaped outer case, the power generation element comprising:
a positive electrode;
a negative electrode;
a separator; and
an aqueous electrolyte solution, wherein
the negative electrode consists of an electrolytic zinc foil,
the electrolytic zinc foil is composed of zinc alloy containing 0.001% by mass or more of Bi as an alloy component, and
the aqueous electrolyte solution is an aqueous solution which contains an electrolyte salt and has a pH of 4 or more and less than 12, or an alkaline electrolyte solution, and
wherein the sheet-shaped cell has a flexibility.

14. The sheet-shaped cell according to claim 13, wherein the electrolytic zinc foil is composed of zinc alloy containing 0.2% by mass or less of Bi as an alloy component.

15. The sheet-shaped cell according to claim 13, wherein the electrolytic zinc foil is composed of zinc alloy containing 0.002 to 0.644% by mass of Bi as an alloy component.

16. The sheet-shaped cell according to claim 13, wherein one side of the electrolytic zinc foil is smoother than the other side.

17. The sheet-shaped cell according to claim 13, wherein the electrolytic zinc foil is composed of zinc alloy containing 0.01% by mass or more of Bi as an alloy component.

* * * * *